Patented Nov. 28, 1944

2,363,501

UNITED STATES PATENT OFFICE 2,363,501

ESTERS OF UNSATURATED ACIDS

Gerald H. Coleman and Wesley D. Schroeder, Midland, Mich., assignors to The Dow Chemical Company, Midland, Mich., a corporation of Michigan No Drawing. Application June 21, 1941,
Serial No. 399,211

4 Claims. (Cl. 260—468)

The present invention is directed to a novel group of ester compounds and is particularly concerned with esters of cycloalkyl-substituted alkenyl-carboxylic acids, having the formula:

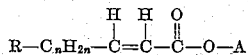

wherein R represents a cycloalkyl radical containing at least six carbon atoms, A represents an aromatic radical, and $n$ is an integer. Preferred compounds falling within the scope of the present invention are those in which R represents a cyclohexyl radical and $n$ is 3. The expression "cycloalkyl" as herein employed includes cyclohexyl, alkyl-cyclohexyl, aralkyl-cyclohexyl, cyclohexyl - cyclohexyl, halo - cyclohexyl, and other cycloalkyl radicals substituted by one or more inert groups.

We have prepared representative members of the above-identified group of compounds, determined their physical and chemical properties, and found them useful as lubricants, parasiticidal toxicants, and modifiers of plastic compositions. These compounds are, for the most part, water-white liquids relatively insoluble in water and soluble in many organic solvents.

The new compounds are prepared by reacting a suitable cycloalkyl-substituted alkenyl-carboxylic acid with a phenol, preferably in the presence of acetic anhydride. Substantially equimolar proportions of the phenol and acid have been found to give the desired ester in good yield. The reaction is carried out at such a temperature as results in the distillation of acetic acid as formed out of the reaction zone. When the reaction is complete, the crude mixture is washed with water to remove the acetic acid and acetic anhydride and the water-immiscible product of the reaction fractionally distilled under reduced pressure to obtain the ester product in substantially pure form. In an alternate procedure the washing step may be omitted.

The following examples illustrate the invention but are not to be construed as limiting the same:

Example 1

39.2 grams of 6-cyclohexyl-Δ2-hexenoic acid, 25.7 grams of 4-chloro-phenol, and 23 grams of acetic anhydride were mixed together and heated to a temperature at which acetic acid as formed was distilled out of the reaction zone. When no more acetic acid was evolved, the crude product was fractionally distilled under reduced pressure to obtain 35 grams of the 4-chloro-phenyl ester of 6-cyclohexyl-Δ2-hexenoic acid as a water-white liquid boiling at 177°–179° C. at 1 mm. pressure and having a specific gravity of 1.092 at 25°/25° C. This compound was insoluble in water and soluble in petroleum distillate, carbon tetrachloride, and 95 per cent ethanol.

Example 2

In a similar manner 15 grams of 4-chloro-phenol was reacted with 22.4 grams of 4-methyl-6-(para-methyl-cyclohexyl)-Δ2-hexenoic acid in the presence of 20 grams of acetic anhydride. Upon fractional distillation of the crude reaction product there was obtained 15 grams of the 4-chloro-phenyl ester of 4-methyl-6-(para-methyl-cyclohexyl)-Δ2-hexenoic acid as an oily liquid boiling at 186°–188° C. at 1 mm. pressure and having a specific gravity of 1.060 at 25°/25° C. This product was insoluble in water and soluble in petroleum distillate, carbon tetrachloride, and 95 per cent ethanol.

Example 3

By substituting other phenols for those shown in the preceding examples the following representative compounds were obtained.

Phenyl ester of 6-cyclohexyl-Δ2-hexenoic acid as a water-white liquid boiling at 199–201° C. at 3 mm. pressure and having a specific gravity of 1.013 at 25°/25° C. This compound is soluble in petroleum distillate and 95 per cent ethanol and insoluble in water.

4-tertiarybutyl-phenyl ester of 6-cyclohexyl-Δ2-hexenoic acid as a viscous oily liquid boiling at 215°–217° C. at 2.5 mm. pressure. This compound has a specific gravity of 0.983 at 25°/25° C.

2-cyclohexyl-phenyl ester of 6-cyclohexyl-Δ2-hexenoic acid as a viscous liquid boiling at 236°–238° C. at 1.5 mm. pressure and having a specific gravity of 1.013 at 25°/25° C. This compound is insoluble in water, very slightly soluble in 95 per cent ethanol and soluble in petroleum distillate.

Other phenols which may be reacted with 6-cyclohexyl-Δ2-hexenoic acid, substantially as described above include 2.4.6-trichloro-phenol, 4-bromo - phenol, 2-chloro-4-tertiaryamyl-phenol, 4-tertiaryoctyl-phenol, 6-n-hexyl-phenol, 4-benzyl-phenol, 2 - methyl - 5 - isopropyl - phenol, 2 - phenyl-phenol, guaiacol, alpha-naphthol, and the like. Other unsaturated acids which may be employed in accordance with the procedure set forth above include 4-cyclohexyl-Δ2-butenoic acid, 5-cyclohexyl-Δ2-pentenoic acid, 4-tertiarybutyl - 6 - (para - tertiarybutyl - cyclohexyl) -Δ2-hexenoic acid, 6 - (para - chloro-cyclohexyl) -Δ2- hexenoic acid, 6-(ortho-cyclohexyl-cyclohexyl)-Δ2-hexenoic acid, and the like.

The 4-cycloalkyl-Δ2-alkenoic acids may be prepared by halogenating the corresponding cycloalkyl-substituted saturated aliphatic acids to form the alpha-halo acid and thereafter dehydrohalogenating with a tertiary amine. One method which may be employed in the preparation of these compounds is described by E. Philippi (M. 51 277 (1929)).

The 6-cyclohexyl-Δ2-hexenoic acid employed in certain of the foregoing examples may be prepared by the oxidation of cyclohexanol. In a representative preparation 5 mols of anhydrous sodium hydroxide, 5 mols of anhydrous potassium hydroxide, and 0.43 mol of caproic acid were mixed and heated to fusion. The fused mixture was stirred continuously and maintained at about 300° C. while 13.28 mols of cyclohexanol was added portionwise thereto. The mixture was then cooled, dissolved in water, and steam-distilled to remove traces of cyclohexanol and low boiling by-products. The residual aqueous layer was evaporated to about 3 liters volume and acidified with hydrochloric acid to liberate the organic acid reaction products as a water-immiscible layer. This layer was separated and fractionally distilled under vacuum whereby there was obtained 4.113 mols of 6-cyclohexyl-Δ2-hexenoic acid. This compound boils at 195°–198° C. at 38 mm. pressure, has a specific gravity of 0.9861 at 20°/4° C., and freezes at approximately −11° C.

4 - methyl - 6 - (para-methyl-cyclohexyl) -Δ2-hexenoic acid is prepared in a manner similar to that described above for the 6-cyclohexyl-Δ2-hexenoic acid. In a representative preparation 570 grams of para-methyl-cyclohexanol was added dropwise with stirring over a period of six hours to a fused mixture of 105 grams of sodium hydroxide and 147.5 grams of potassium hydroxide at about 300° C. After all of the para-methyl-cyclohexanol had been added, the reaction mixture was cooled, dissolved in water, and steam-distilled to separate unreacted para-methyl-cyclohexanol. The residue from the steam-distillation was cooled, filtered, and acidified with hydrochloric acid to precipitate a mixture of organic acids as an oily layer. This crude product was separated by decantation, washed with water, and fractionally distilled, whereby there was obtained 229 grams of 4-methyl - 6 - (para-methyl-cyclohexyl) -Δ2-hexenoic acid boilling at 167°–170° C. at 2.5 mm. pressure and having a specific gravity of 0.963 at 20°/4° C.

We claim:

1. An ester having the formula

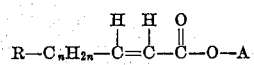

wherein R represents a member of the group consisting of cyclohexyl, chloro-cyclohexyl, cyclohexyl-cyclohexyl, and alkyl-cyclohexyl radicals, A represents an aromatic radical, and $n$ is an integer.

2. An ester having the formula

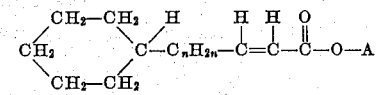

wherein A represents an aromatic radical, and $n$ is an integer.

3. An ester having the formula

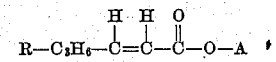

wherein R represents a member of the group consisting of cyclohexyl, chloro-cyclohexyl, cyclohexyl-cyclohexyl, and alkyl-cyclohexyl radicals, and A represents an aromatic radical.

4. An ester having the formula

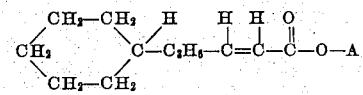

wherein A represents an aromatic radical.

GERALD H. COLEMAN.
WESLEY D. SCHROEDER.